United States Patent
Lee et al.

(10) Patent No.: US 6,824,896 B2
(45) Date of Patent: Nov. 30, 2004

(54) SYSTEM AND METHOD FOR RECORDING MEDIA ON TEXTURED GLASS

(75) Inventors: Li-Lien Lee, San Jose, CA (US);
Samuel Dacke Harkness, Berkeley, CA (US); Kien Vinh Hua, San Jose, CA (US); Eric Steck Freeman, Oakland, CA (US)

(73) Assignee: Seagate Technology LLC, Scotts Valley, CA (US)

( * ) Notice: Subject to any disclaimer, the term of this patent is extended or adjusted under 35 U.S.C. 154(b) by 7 days.

(21) Appl. No.: 10/335,348

(22) Filed: Dec. 31, 2002

(65) Prior Publication Data

US 2003/0134153 A1 Jul. 17, 2003

Related U.S. Application Data

(60) Provisional application No. 60/348,750, filed on Jan. 14, 2002.

(51) Int. Cl.[7] .............................. G11B 5/66; G11B 5/70; B05D 5/12
(52) U.S. Cl. ........................ 428/694 TS; 428/694 TM; 428/694 TC; 428/694 SG; 428/336; 428/900; 428/611; 428/667; 427/129; 427/131
(58) Field of Search ........................ 428/694 T, 694 TS, 428/694 TC, 694 SG, 900, 611, 667, 694 TM, 336; 427/129, 131

(56) References Cited

U.S. PATENT DOCUMENTS 5,789,056 A    8/1998   Bian et al.
6,596,419 B1 * 7/2003   Chen et al. ............ 428/694 TS
6,673,474 B2 * 1/2004   Yamamoto ............ 428/694 ST

OTHER PUBLICATIONS

U.S. patent application Ser. No. 09/619,394, Chen et al., filed Jul. 19, 2000.
U.S. patent application Ser. No. 09/960,538, Chen et al., filed Sep. 24, 2001.
M. Yu et al., "A systematic study of in–plane magnetic anisotropy in CoCrPtB alloy", BC–04, 46th Annual Conference on Magnetism and Magnetic Materials, Nov. 12–16, 2001.

* cited by examiner

Primary Examiner—Holly Rickman
(74) Attorney, Agent, or Firm—Raghunath S. Minisandram; Jesus Del Castillo

(57) ABSTRACT

A magnetic media structure 200 deposited on glass substrates without a NiP layer having oriented media ($OR_{MRT}>1$), high coercivity and high SMNR is presented. This media will significantly reduce the cost of making high quality media on glass substrates by eliminating the cost associated with additional steps of depositing a NiP layer and texturing that layer. First glass substrates are mechanically textured to have a surface roughness of about 1 Å to about 12 Å. The first layer of the magnetic structure contains Cr and Ti with a Ti content of 27 to 63 atomic percentage. The second layer contains Co and Ti with a Ti content of 43 to 55 atomic percentage. The third layer is a Cr-alloy layer wherein the alloy is an element chosen from W, Mo, V, Si, Ti, Mn, Ru, B, Nb, Ta, Zr, and Pt. The fourth layer is $Co_{58}Cr_{37}Pt_5$ and the fifth layer is $Co_{61}Cr_{15}Pt_{12}B_{12}$. Finally, the protective overcoat is typically a hard material that contains hydrogenated carbon.

20 Claims, 5 Drawing Sheets

SYSTEM AND METHOD FOR RECORDING MEDIA ON TEXTURED GLASS

This application claims priority from U.S. provisional application Ser. No. 60/348,750 filed on Jan. 14, 2002.

BACKGROUND OF THE INVENTION

1. Field of the Invention

The present invention relates generally to the field of disc drive storage, and more particularly to magnetic recording media on directly textured glass substrates.

2. Description of the Related Art

Conventional disc drives are used to magnetically record, store and retrieve digital data. Data is recorded to and retrieved from one or more discs that are rotated at more than one thousand revolutions per minute (rpm) by a motor. The data is recorded and retrieved from the discs by an array of vertically aligned read/write head assemblies, which are controllably moved from data track to data track by an actuator assembly.

The three major components making up a conventional hard disc drive are magnetic media, read/write head assemblies and motors. Magnetic media, which is used as a medium to magnetically store digital data, typically includes a layered structure, of which at least one of the layers is made of a magnetic material, such as CoCrPtB, having high coercivity and high remnant moment. The read/write head assemblies typically include a read sensor and a writing coil carried on an air bearing slider attached to an actuator. This slider acts in a cooperative hydrodynamic relationship with a thin layer of air dragged along by the spinning discs to fly the head assembly in a closely spaced relationship to the disc surface. The actuator is used to move the heads from track to track and is of the type usually referred to as a rotary voice coil actuator. A typical rotary voice coil actuator consists of a pivot shaft fixedly attached to the disc drive housing closely adjacent to the outer diameter of the discs. Motors, which are used to spin the magnetic media at rates of higher than 10,000 revolutions per minute (rpm), typically include brushless direct current (DC) motors. The structure of disc drives is well known.

Magnetic media can be locally magnetized by a read/write head, which creates a highly concentrated magnetic field that alternates direction based upon bits of the information being stored. The highly concentrated localized magnetic field produced by the read/write head magnetizes the grains of the magnetic media at that location, provided the magnetic field is greater than the coercivity of the magnetic media. The grains retain a remnant magnetization after the magnetic field is removed, which points in the same direction of the magnetic field. A read/write head that produces an electrical response to a magnetic signal can then read the magnetization of the magnetic media Magnetic media structures are typically made to include a series of thin films deposited on top of aluminum substrates, ceramic substrates or glass substrates. FIG. 1A illustrates a conventional magnetic media structure built on top of a glass substrate including a glass substrate 110, a nickel-phosphorous (NiP) layer 115, a seed layer 120, a magnetic layer 125 and a protective layer 130. The glass substrate 110 is typically a high quality glass having few defects such as those produced by OHARA Disk (M) SDN. BHD of Melaka, Malaysia The nickel-phosphorous (NiP) layer 115 is an amorphous layer that is usually electrolessly plated or sputtered onto the glass substrate 110. The NiP layer is used to enhance both the mechanical performance and magnetic properties of the disk. The NiP layer enhances the mechanical properties of the disk by providing a hard surface on which to texture. The magnetic properties are enhanced by providing a textured surface which improves the magnetic properties including the orientation ratio (OR) as is further discussed below. However, the disadvantage of applying the NiP layer 115 is that it adds another step in the process of making magnetic media, which adds to the cost of the magnetic media.

Seed layer 120 is typically a thin film made of chromium that is deposited onto the NiP layer 115 and forms the foundation for structures that are deposited on top of it. Magnetic layer 125, which is deposited on top of seed layer 120, typically include a stack of several magnetic and non-magnetic layers. The magnetic layers are typically made out of magnetic alloys containing cobalt (Co), platinum (Pt) and chromium (Cr), whereas the non-magnetic layers are typically made out of metallic non-magnetic materials. Finally, protective overcoat 130 is a thin film typically made of carbon and hydrogen, which is deposited on top of the magnetic layers 125 using conventional thin film deposition techniques.

FIG. 1B is a flow chart illustrating the prior art conventional method of making the conventional magnetic media structure discussed with reference to FIG. 1A above. First in step 140 a substrate 110 is prepared for deposition prior to cleaning. Next in step 145 the substrate is cleaned using conventional cleaning procedures that clean the substrate and prepares it for thin film deposition. In step 150, the NiP layer 115 is deposited onto the substrate. Typically, the NiP layer 115 is plated onto the substrate, if the substrate is aluminum and sputtered on if the substrate is glass or ceramic. Next in step 155 the NiP layer 115 is mechanically textured. Next in step 160 the seed layer 120 is deposited using conventional thin film deposition techniques. In step 165 the magnetic layer or layers 125 are deposited using similar techniques as used in step 160 to deposit seed layer 120. In step 170, the protective overcoat layer 130 is deposited over the magnetic layers 125. Typically, this protective overcoat layer 130 consists of carbon with hydrogen and is deposited directly after of the previous layer while the substrate remains under vacuum. The protective overcoat layer 130 is typically deposited by transferring the substrate with thin films, while being kept under vacuum, to an adjacent chamber that is isolated from the chambers previously used to deposit films. Protective overcoat layer 130 is typically deposited in an isolated chamber because reactive gasses containing hydrogen or nitrogen can be used in the deposition process. Finally in step 175 the vacuum deposition process ends by moving the conventional media structure into a load lock and unloading the media structure from the vacuum chamber.

Generally, macroscopic in-plane magnetic anisotropy is induced when magnetic recording media are sputtered on mechanically textured NiP coated disk substrates. In such case, the remnant moment ($M_{rt}$) is higher in the circumferential direction than in the radial direction. The orientation ratio $OR_{MRT}$ is defined as the ratio of the measured $M_{rt}$ in the circumferential direction to the measured $M_{rt}$ in the radial direction. Media with $OR_{MRT}>1$ is called oriented media and media with $OR_{MRT}=1$ is called isotropic media. One way of achieving orientated media on glass substrates 110, is to mechanically texture the NiP layer 115 before films are sputtered onto them as was discussed with reference to FIG. 1B above However, this procedure of depositing a NiP layer 115 onto the glass substrate 110 and mechanically texturing the NiP layer 115 significantly increases the cost of making magnetic media. Magnetic recording media sputtered directly on glass substrates are usually isotropic ($OR_{MRT}=1$).

The advantages of oriented media is that they have higher thermal stability and better recording performance such as narrow pulse width and low media noise compared to isotropic media. However, the disadvantages of making oriented media on glass substrates are the additional cost and processing which is associated with depositing the NiP layer 115 and consequently texturing the NiP layer.

There exists a particular need for a magnetic recording media comprising an alternate substrate, such as glass or ceramic, which exhibits $OR_{MRT}>1$ and is suitable for high aerial density recording application. Therefore what is needed is a system and method that produces oriented media ($OR_{MRT}>1$) having high coercivity and high SMNR on glass substrates without depositing a NiP layer and texturing the NiP layer. This media will significantly reduce the cost of making high quality media on glass substrates by eliminating the cost associated with additional steps of depositing a NiP layer and texturing that layer.

SUMMARY OF THE INVENTION

This limitation is overcome by depositing a magnetic media structure on a textured glass substrate. The magnetic media structure includes a first layer having Cr and Ti, a second layer having Co and Ti, a third layer having a Cr-alloy, a fourth layer having Co, Cr and Pt, a fifth layer having Co, Cr, Pt and B and a protective overcoat layer. This structure produces oriented media with $OR_{MRT}>1$ on directly textured glass substrates without using a nickel phosphorous (NiP) coating.

In accordance with one embodiment of the invention, the glass substrates are mechanically textured to have a surface roughness of about 1 Å to about 12 Å. Additionally, the first layer having Cr and Ti has a Ti content of 27 to 63 atomic percentage whereas the second layer having Co and Ti has a Ti content of 43 to 55 atomic percentage. The third layer comprising a Cr-alloy layer may contain at least one alloying element chosen from W, Mo, V, Si, Ti, Mn, Ru, B, Nb, Ta, Zr, and Pt. Moreover, the thickness of the first layer having Cr and Ti is between 5 Å and 200 Å, the thickness of the second layer having Co and Ti is between 10 Å and 200 Å, and the thickness range for Cr-alloy is 15 Å to 200 Å. Finally, the protective overcoat is a hard material typically containing hydrogenated carbon. One specific embodiment could include a glass substrate textured to have a surface roughness of about 1 Å to about 12 Å, a 35 Å layer of $Cr_{65}Ti_{35}$, a 50 Å layer of $Co_{50}Ti_{50}$, a 10 Å layer of $Cr_{90}W_{10}$, a 35 Å layer of $Co_{58}Cr_{37}Pt_5$, a layer of $Co_{61}Cr_{15}Pt_{12}B_{12}$ whose thickness depends on the magnetic properties, and a hydrogenated carbon protective overcoat.

In addition to having an oriented media ($OR_{MRT}>1$) without a nickel phosphorous (NiP) coating directly over the glass substrate, the disclosed magnetic media structure deposited on directly textured glass has high coercivity (Hcr) and high signal-to-media noise ratio (SMNR). The above-mentioned disclosed structure deposited on a directly textured glass substrate can have an $OR_{MRT} \approx 1.3$, an Hcr≈5000 Oe and an SMNR≈16 dB.

BRIEF DESCRIPTION OF THE INVENTION

DETAILED DESCRIPTION OF THE PREFERRED EMBODIMENTS

The invention provides a system and method for high areal density magnetic recording media deposited on glass substrates exhibiting oriented media magnetic properties.

Figure 1A:
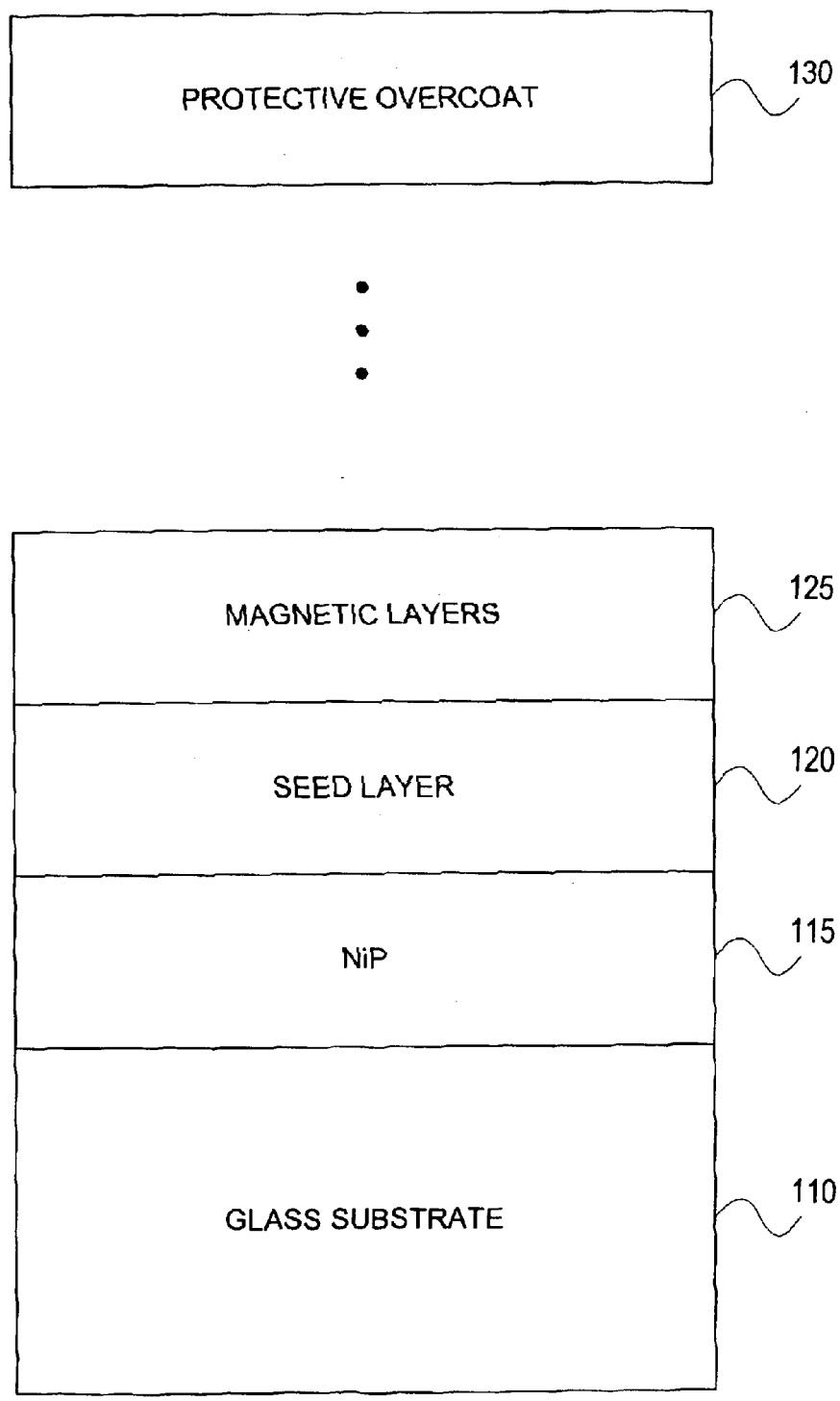
FIG. 1A is a block diagram showing a prior art conventional magnetic media structure using glass substrates.
Figure 1B:
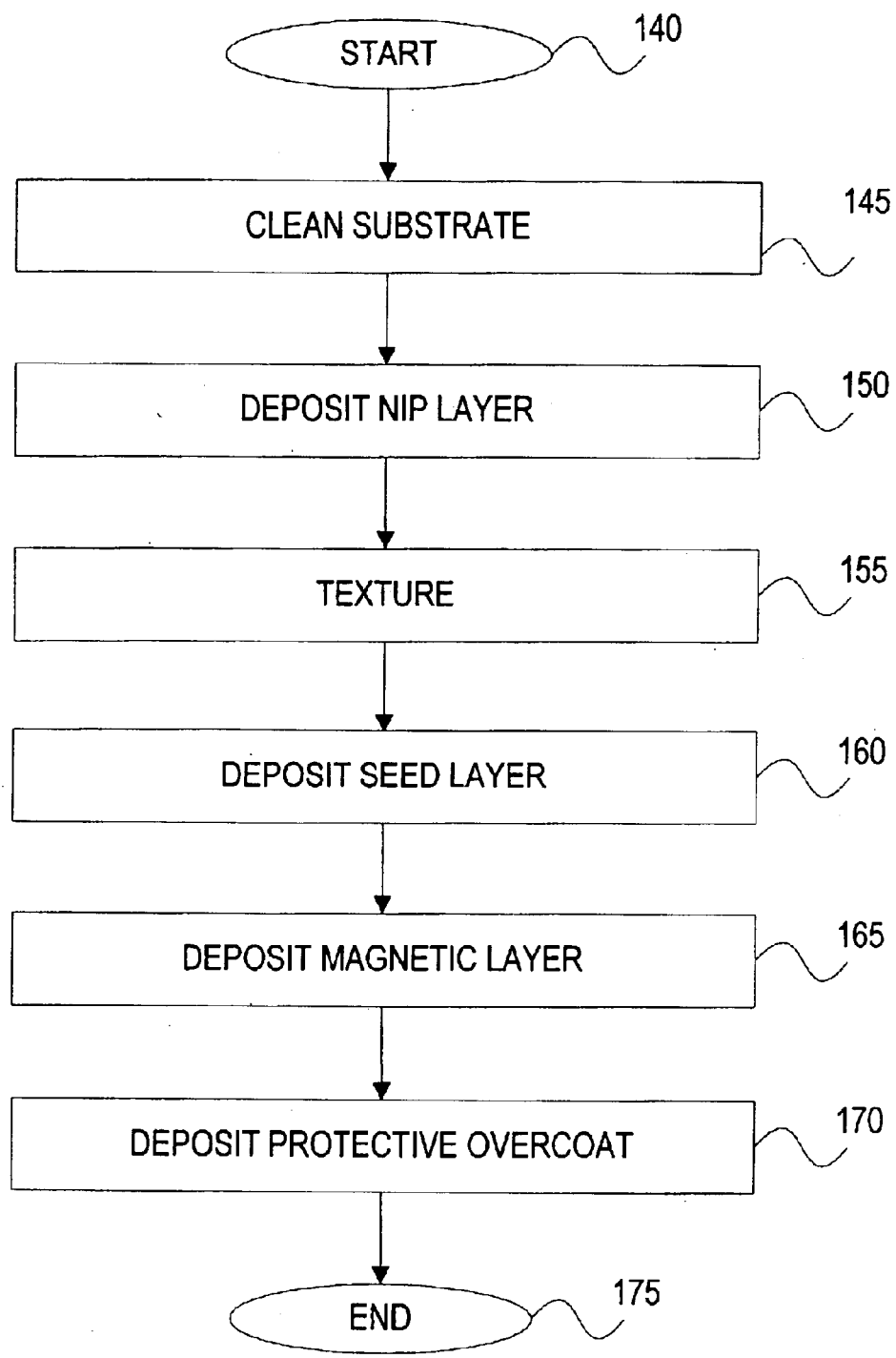
FIG. 1B is a flowchart illustrating the prior art method of making magnetic media using a glass substrate.
Figure 2:
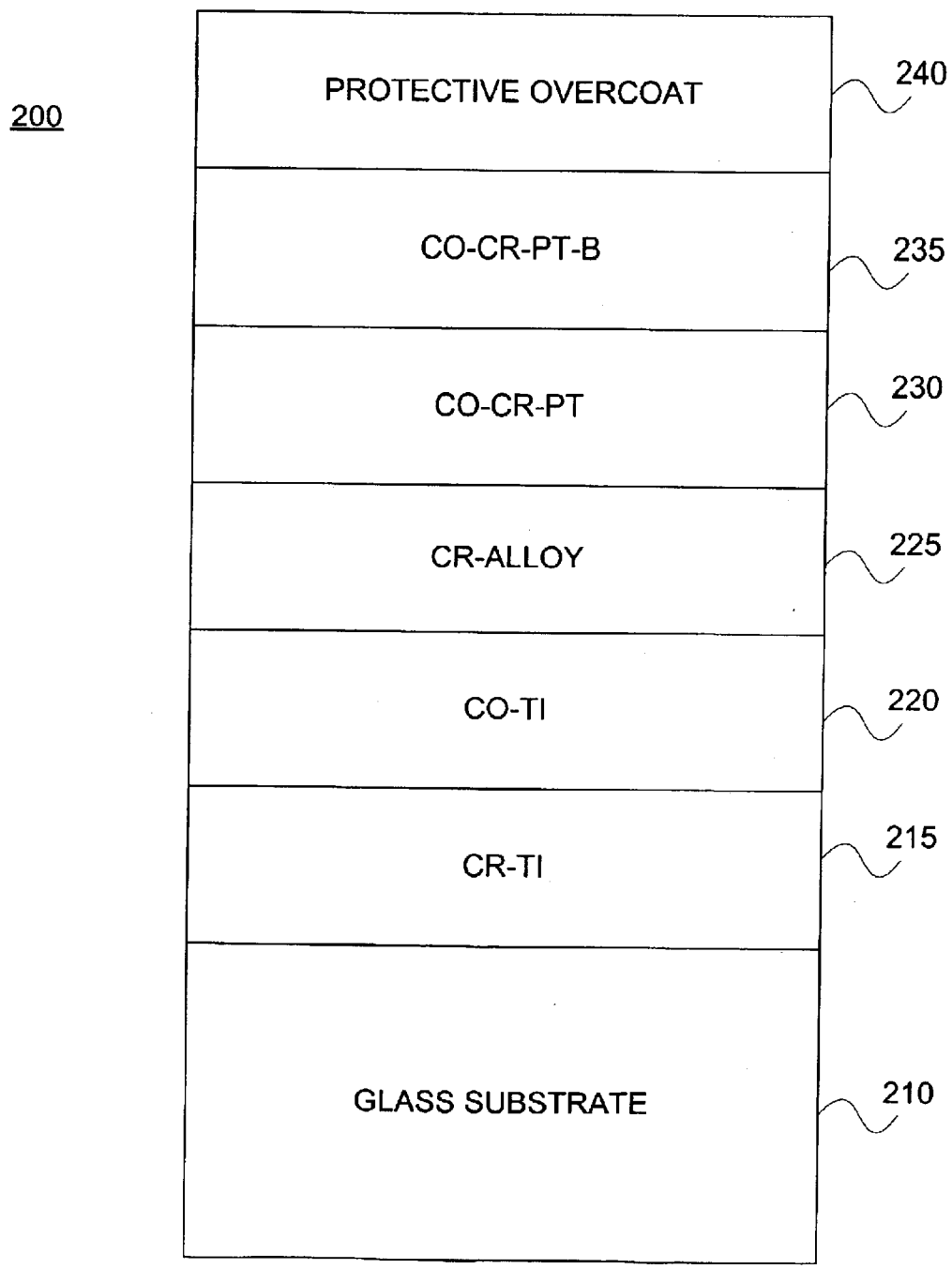
FIG. 2 is a block diagram showing a magnetic media structure using glass substrates in accordance with one embodiment of the invention.

FIG. 2 illustrates a magnetic media structure 200, in accordance with one embodiment of the invention, including a glass substrate 210, a CrTi layer 215, a CoTi layer 220, a Cr-alloy layer 225, a CoCr Pt layer 230, a CoCrPtB layer 235 and a protective overcoat layer 240. Specifically, in one embodiment the CrTi layer 215 is $Cr_{65}Ti_{35}$, the CoTi layer 220 is $Co_{50}Ti_{50}$, the Cr-alloy layer 225 is $Cr_{90}W_{10}$, the CoCr Pt layer 230 is $Co_{58}Cr_{37}Pt_5$ and the CoCrPtB layer 235 is $Co_{61}Cr_{15}Pt_{12}B_{12}$. Other possible concentrations are discussed below.

Substrate 210 is typically a high quality glass or ceramic substrate. The CrTi layer 215 is a seed layer that is amorphous and is used to isolate the later deposited films from the substrate 210. Since the substrate can release contaminants which migrate into the later deposited films, which adversely affects the magnetic properties, the CrTi layer 215 is used to separate the substrate from the rest of the later deposited structure. Other amorphous films similar to CrTi may be used to separate the substrate from the subsequently deposited layers. With the CrTi layer 215 deposited on top of the glass substrate 210, the following CoTi layer 220 can be deposited onto the CrTi layer 215 without being adversely impacted by substrate 210. The CoTi layer 220 is an underlayer having a B2 crystal structure. The B2 crystal structure of the CoTi layer 220 is used to enhance the coercivity of the later deposited magnetic films by orienting the crystal growth. The Cr-alloy layer 225 is an intermediate layer, which may contain at least one alloying element chosen from W, Mo, V, Si, Ti, Mn, Ru, B, Nb, Ta, Zr, and Pt. The combination of the CoTi and the Cr-alloy is used to increase the signal-to-media noise ratio (SMNR) as is further discussed with reference to FIG. 5 below. The combination of the CoCr Pt layer 230 and CoCrPtB layer 235 make up the magnetic layer, which gives the desired magnetic properties including coercivity and total moment. In particular, the CoCr layer 230 is a non-magnetic or weakly magnetic HCP layer used for better orientation, while the CoCrPtB layer 235 is a magnetic material, which provides the magnetic signal. Protective overcoat layer 240 is a hard overcoat layer that is lubricated and permits the head to glide over the surface without wearing out the media, which could lead to a malfunction of the disc drive. Typically, protective overcoat layer 240 is made of combinations of carbon, hydrogen and nitrogen.

Although the one embodiment described above with reference to FIG. 2 only references one specific concentration of elements in each layer, other embodiments having different concentrations of elements in each layer can be used to produce oriented media. In particular, although one embodiment of the CrTi layer 215 was described as having a Ti content of 35 atomic percentage and a Cr content of 65 atomic percentage, other embodiments can have a Ti content of 27 to 63 atomic percentage with a corresponding Cr content of 73 to 37 atomic percentage. Similarly, although one embodiment of the CoTi layer 215 was described as having Co and Ti contents of 50 atomic percentage each, other embodiments can have a Ti content of 43 to 55 atomic percentage, with a corresponding Co content of 57 to 45 atomic percentage. Other embodiments consist of having the Cr-alloy layer 225 containing at least one alloying element chosen from W, Mo, V, Si, Ti, Mn, Ru, B, Nb, Ta, Zr, and Pt. In addition, the thicknesses of the different layers can be varied to produce oriented media. For example, the thickness of the CrTi layer 215 can be varied between 5 Å and 200 Å, the thickness of the CoTi layer 220 can be varied between 10 Å and 200 Å and the thickness of the Cr-alloy 225 can be varied between 15 Å to 200 Å. Finally, oriented media is produced when the mechanical texture of the glass substrate has a surface roughness (Ra), in the range of 1 Å to 12 Å, as measured by atomic force microscopy (AFM) over a scan area of 5 micrometer×5 micrometer.

Typically, substrates 210, which are made of glass or ceramic material, tend to lower the coercivity of the finished media. Therefore the CrTi layer 215, which is amorphous, is used to shield the later deposited films from the substrate so that the next deposited $CoTi_{50}$ layer 220 can set up a B2 crystal structure. If the CrTi layer 215 is not used then the preferred orientation of the glass substrate 210 interferes with the preferred B2 crystal structure. The B2 crystal structure of the CoTi layer 220 is used to enhance the coercivity and increase the $OR_{MRT}$ of the later deposited magnetic films. The effects, which CrTi has on the coercivity and ORMRT for the structure discussed with reference to FIG. 2 above, are discussed later with reference to Table 1, which compares coercivity and $OR_{MRT}$ data both with and without the 50-Angstrom CrTi film.

Figure 3:
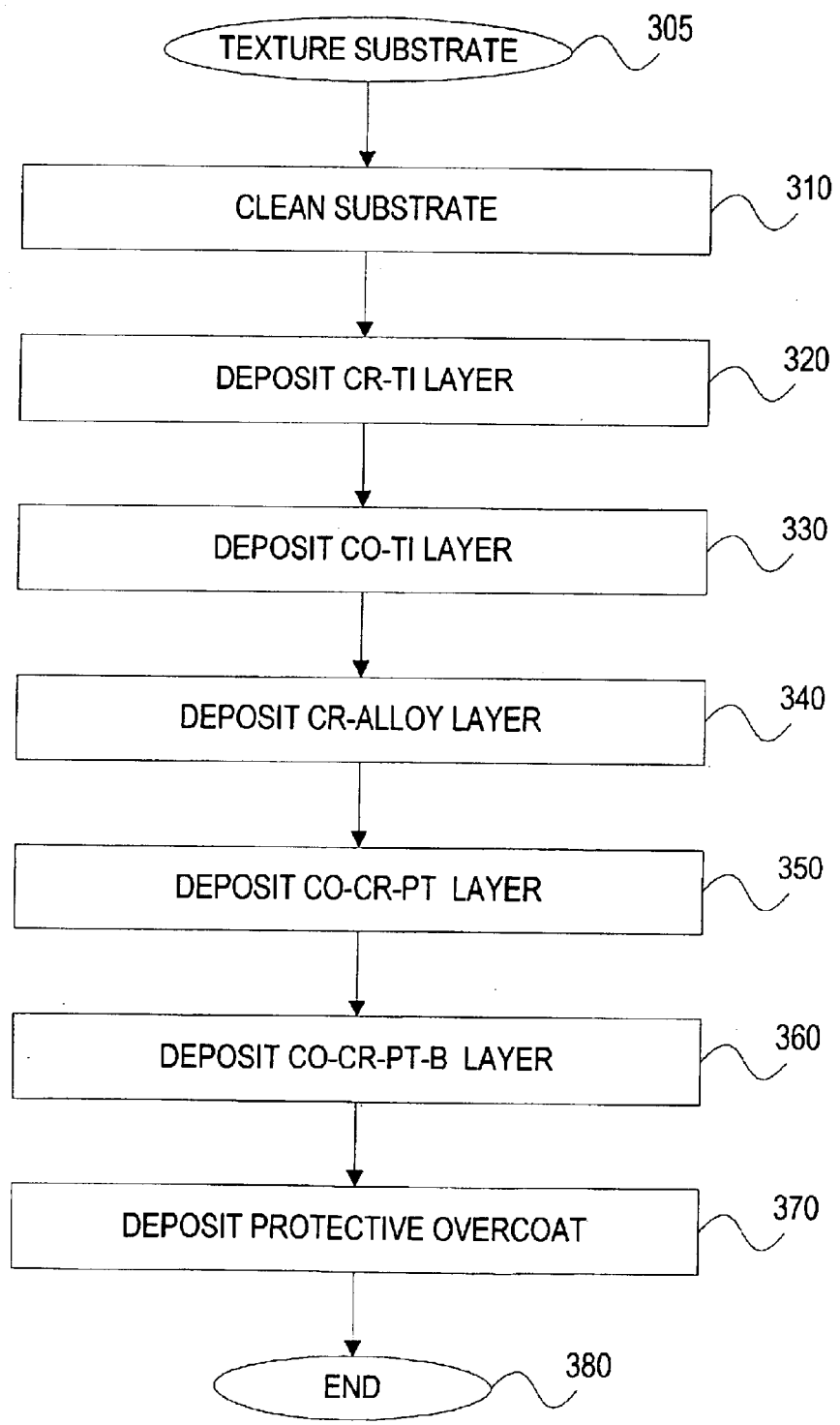
FIG. 3 is a flowchart illustrating the preferred method of making magnetic media structure 200 on a glass substrate.

FIG. 3 is a flowchart illustrating the preferred method of making magnetic media structure 200 on a glass or ceramic substrate. First in step 305 a substrate 210 is textured prior to cleaning. In step 305, the glass substrate is textured, using conventional mechanical texturing processes, to have a surface roughness of about 1 Å to about 12 Å. Next in step 310 the substrate is cleaned using a conventional glass cleaning procedure-involving combinations of acids, detergents, alcohol, solvents and water. This step cleans the substrate 210 of any residue left over from the texturing process and prepares the substrate 210 for the subsequent thin film deposition process. In step 320, the CrTi seed layer is deposited onto the substrate creating an amorphous CrTi layer on the substrate. Typically the CrTi layer is sputter deposited onto the substrate using conventional thin film growth techniques. Since the CrTi is typically sputter deposited, the substrate is loaded into a vacuum deposition apparatus after it is cleaned in step 310 and before the CrTi layer 220 is deposited in step 320.

Next in step 330 the CoTi layer 220 is deposited onto the CrTi layer 215. This is typically done in the same deposition apparatus as the CrTi was deposited and is usually accomplished by moving the substrate in front of a CoTi target or moving the CoTi target in front of the substrate and striking a plasma resulting in the deposition of the CoTi layer 220 on the CrTi layer 215. Next in step 340, the Cr-alloy layer 225 is deposited onto the CoTi layer 220 using the same apparatus and procedure as used in steps 330 and 340. Next in step 350, the CoCrPt layer 230 is deposited using similar processes as were used in steps 330 through 340. Similarly, the CoCrPtB layer 235 is deposited over the CoCrPt layer 230 in step 360. In step 370, the protective overcoat layer 240 is deposited over the CoCrPtB layer 235. Typically, this protective overcoat layer 240 consists of carbon with hydrogen and is deposited directly after deposition of the previous deposited magnetic layers while the substrate remains under vacuum. The protective overcoat layer 240 is typically deposited by transferring the substrate with thin films, while being kept under vacuum, to an adjacent chamber that is isolated from the chambers previously used to deposit the CrTi layer 215, CoTi layer 220, Cr-alloy layer 225, CoCrPt layer 230, and CoCrPtB layer 235. Protective overcoat layer 240 is typically deposited in an isolated chamber because reactive gasses containing hydrogen or nitrogen can be used in the deposition process. Finally in step 380 the vacuum deposition process ends by moving the sputtered magnetic media structure 200 into a load lock and unloading the magnetic media structure 200 from the vacuum chamber.

The above-mentioned process can be done with a variety of different thin film deposition processes including but not limited to plasma sputter deposition, ion beam deposition, chemical vapor deposition and reactive ion sputtering as is know to those skilled in the art.

Figure 4:
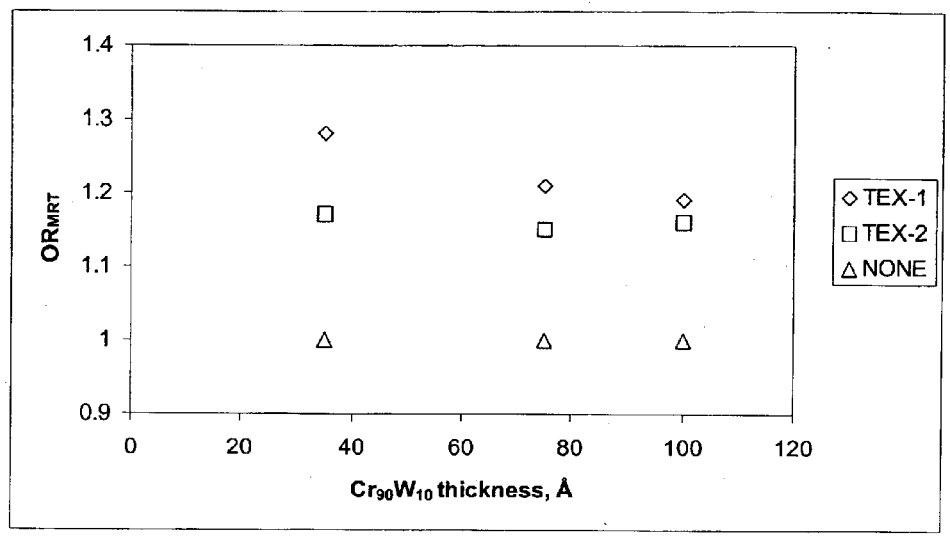
FIG. 4 is a graph showing the oriented ratio $OR_{MRT}$ of the magnetic structure 200 as a function of $Cr_{90}W_{10}$ thickness for magnetic structures deposited on several glass substrates having different textures.

FIG. 4 is a graph showing the oriented ratio $OR_{MRT}$ of the magnetic structure 200 as a function of $Cr_{90}W_{10}$ thickness for magnetic structures deposited on glass substrates that are not textured (NONE), glass substrates that are mechanically textured to have a roughness of 2.4 Å (TEX-1) and glass substrates that are mechanically textured to have a roughness of 10.2 Å (TEX-2). Both TEX-1 and TEX-2 were circumferentially textured to achieve the surface roughnesses of 2.4 Å and 10.2 Å, respectfully. $OR_{MRT}$ data for magnetic structure 200 deposited on glass substrates 210 that are not textured (NONE) exhibits an $OR_{MRT}=1$ for $Cr_{90}W_{10}$ thicknesses of approximately 40 Å, 80 Å and 100 Å, indicating that the magnetic structure deposited on a non-textured glass substrate is isotropic. $OR_{MRT}$ data for magnetic structure 200 deposited on glass substrates 210 that are textured to have a surface roughness of 2.4 Å (TEX-1) exhibits an $OR_{MRT}>1$ for $Cr_{90}W_{10}$ thicknesses of approximately 40 Å, 80 Å and 100 Å, indicating that the magnetic structure deposited on a the glass substrate textured to have a surface roughness of 2.4 Å is oriented media. Similarly, the magnetic structure 200 deposited on glass substrates 210 that are textured to have a surface roughness of 10.2 Å (TEX-2) is oriented media.

FIG. 4 shows that the magnetic structure 200 deposited on a TEX-1 substrate has the highest $OR_{MRT}$. FIG. 4 also shows that the $OR_{MRT}$ for a TEX-1 substrate is greater than one but decreases as the $Cr_{90}W_{10}$ thickness increases. In fact, FIG. 4 shows that $OR_{MRT} \approx 1.3$ for low $Cr_{90}W_{10}$ thickness of approximately 30 Å but decreases to $OR_{MRT} \approx 1.2$ for higher $Cr_{90}W_{10}$ thickness of about 100 Å. Additionally, FIG. 4 shows that the magnetic structure 200 deposited on a TEX-2 substrate has a slightly lower $OR_{MRT}$ with $OR_{MRT}$ approximately equal to 1.2 for thinner $Cr_{90}W_{10}$ and decreasing to approximately 1.15 for thicker $Cr_{90}W_{10}$. Finally, FIG. 4 shows that the $OR_{MRT} \approx 1$ for a non-textured substrate (NONE) with $Cr_{90}W_{10}$ thickness ranging between about 30 Å and 100 Å. This shows proper mechanically textured substrates can be used for achieving oriented media $OR_{MRT}>1$. Moreover, this data shows that fine and dense texture lines, such as those found in TEX-1 substrates, have the highest $OR_{MRT}$ suggesting that the surface roughness must be optimized according to the particular magnetic structure deposited on the substrate.

Figure 5:
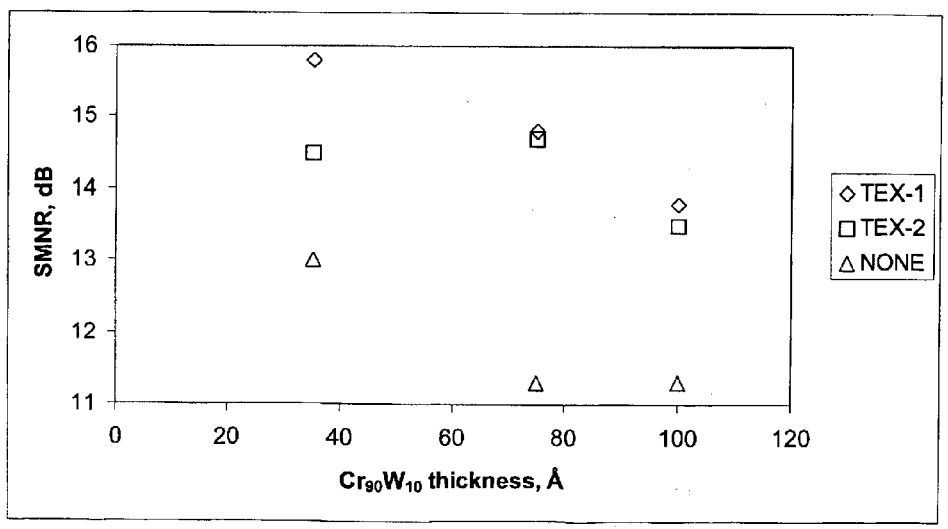
FIG. 5 is a graph showing the signal-media noise ratio (SMNR) of the magnetic structure 200 as a function of $Cr_{90}W_{10}$ thickness for magnetic structures deposited on several glass substrates having different textures.

FIG. 5 is a graph showing the signal-to-media noise ratio (SMNR) of the magnetic structure 200 as a function of $Cr_{90}W_{10}$ thickness for magnetic structures deposited on glass substrates that are not textured (NONE), glass substrates that are mechanically textured to have a surface roughness of 2.4 Å (TEX-1) and glass substrates that are mechanically textured to have a surface roughness of 10.2 Å (TEX-2). Magnetic media structure 200 deposited on a glass substrate that is not textured has the lowest SMNR ranging from 13 dB at $Cr_{90}W_{10}$ thickness of approximately 30 Å to approximately 11 dB for $Cr_{90}W_{10}$ thickness of approximately 100 Å. The SMNRs of TEX-1 and TEX-2 have SMNRs of approximately 16 dB and 14.5 dB respectively at $Cr_{90}W_{10}$ thickness of approximately 30 Å and SMNRs of approximately 13.5 dB for $Cr_{90}W_{10}$ thickness of approximately 100 Å. This data reveals that the SMNR increases as the texturing becomes more fine and dense. Additionally, FIG. 5 shows that the SMNR of oriented media on directly textured substrates can be 2–3 dB higher than that of isotropic media on non-textured substrates.

Table 1 shows a comparison of $OR_{MRT}$ and Hcr between magnetic media structure 200 deposited with a 50 Å CrTi seed layer and deposited without a CrTi seed layer. The data shown in table 1 is for magnetic media structure 200 deposited on a glass substrate with TEX-1 texturing (surface roughness of 2.4 Å). The data in Table 1 reveals that magnetic media structure 200 deposited without the CrTi seed layer has an $OR_{MRT}$ of 1.034 and an $H_{cr}$ of 2880 Oe whereas media deposited with a 50 Å CrTi seed layer has an $OR_{MRT}$ of 1.262 and an $H_{cr}$ of 4950 Oe. When the CrTi seed layer is not used, the preferred orientation (002)\(1120) of the magnetic structure 200 weakens resulting in a coercivity drop. In other words the CrTi seed layer enhances the coercivity by inducing the preferred orientation (002)\(1120). Since the CrTi layer is amorphous, its presence permits the CoTi layer B2 crystal structure to remain intact. If the amorphous CrTi layer is not present then the glass structure adversely impacts the structure of the following layer, which would be the CoTi layer.

TABLE 1

|  | With 50 A CrTi | Without CrTi |
|---|---|---|
| $OR_{MRT}$ | 1.262 | 1.034 |
| $H_{cr}$ | 4950 Oe | 2880 Oe |

It will also be recognized by those skilled in the art that, while the invention has been described above in terms of preferred embodiments, it is not limited thereto. Various features and aspects of the above-described invention may be used individually or jointly. Further, although the invention has been described in the context of its implementation in a particular environment and for particular applications, those skilled in the art will recognize that its usefulness is not limited thereto and that the present invention can be utilized in any number of environments and implementations.

What is claimed is:

1. A system for recording data, comprising:

a textured glass substrate; and a magnetic media structure, deposited over said textured glass substrate, said magnetic media structure comprising:
   a CrTi layer;
   a CoTi layer;
   a Cr-alloy layer;
   a Co-alloy layer;
   a CoCrPtB layer; and
   a protective overcoat.

2. The system of claim 1 wherein said textured glass substrate has a surface roughness of greater than 1 Å.

3. The system of claim 1 wherein said textured glass substrate has a surface roughness of about 1 Å to about 12 Å.

4. The system of claim 1 wherein said Co-alloy includes Cr and Pt.

5. The system of claim 1 wherein said CrTi layer has a Ti content of 27 to 63 atomic percentage.

6. The system of claim 1 wherein said CoTi layer has a Ti content of 43 to 55 atomic percentage.

7. The system of claim 1 wherein said Cr-alloy comprises Cr and an element selected from the group consisting of W, Mo, V, Si, Ti, Mn, Ru, B, Nb, Ta, Zr, and Pt.

8. The system of claim 1 wherein said protective overcoat further comprises carbon.

9. A system for recording data, comprising:
   a textured glass substrate;
   a first layer having Cr and Ti;
   a second layer with a B2 crystal structure having Co and Ti;
   a third layer comprising Cr;
   a fourth layer comprising $Co_{58}Cr_{37}Pt_5$;
   a fifth layer comprising $Co_{61}Cr_{15}Pt_{12}B_{12}$; and
   a protective overcoat.

10. The system of claim 9 wherein said first layer has a thickness of between 5 Å and 200 Å.

11. The system of claim 9 wherein said second layer has a thickness of between 10 Å and 200 Å.

12. The system of claim 9 wherein said third layer has a thickness of between 15 Å and 200 Å.

13. The system of claim 9 wherein said fourth layer has a thickness of between 25 Å and 100 Å.

14. The system of claim 9 wherein said first layer has a Ti content of 27 to 63 atomic percentage.

15. The system of claim 9 wherein said second layer has a Ti content of 43 to 55 atomic percentage.

16. The system of claim 9 wherein said third layer further comprises an element selected from the group consisting of W, Mo, V, Si, Ti, Mn, Ru, B, Nb, Ta, Zr, and Pt.

17. The system of claim 9 wherein said textured glass substrate has a surface roughness within the range of about 1 Å to about 12 Å.

18. A system for recording data, comprising:
   a glass substrate textured to have a surface roughness of about 1 Å to about 12 Å;
   a first layer comprising of $Cr_{65}Ti_{35}$ having a thickness in the range of about 25 Å to about 70 Å;
   a second layer comprising of $Co_{50}Ti_{50}$ having a thickness in the range of about 20 Å to about 100 Å;
   a third layer comprising of a Cr alloy having a thickness in the range of about 20 Å to about 70 Å;
   a fourth layer comprising of $Co_{58}Cr_{37}Pt_5$, said fourth layer having a thickness in the range of about 25 Å to about 100 Å and said fourth layer having an HCP structure for improving the orientation of subsequently deposited layers; and
   a $Co_{61}Cr_{15}Pt_{12}B_{12}$ layer; and
   a protective overcoat.

19. A system for recording data, comprising:
   a textured glass substrate;
   a first layer having Cr and Ti;
   a second layer with a B2 crystal structure having Co and Ti deposited on said first layer;
   a third layer comprising Cr deposited on said second layer;
   a fourth layer comprising $Co_{58}Cr_{37}Pt_5$ deposited on said third layer;
   a fifth layer comprising $Co_{61}Cr_{15}Pt_{12}B_{12}$ deposited on said fourth layer; and
   a protective overcoat deposited on said fifth layer.

20. A method for making recording medium, comprising:
   texturing a glass substrate;
   depositing a first layer having Cr and Ti;
   depositing a second layer with a B2 crystal structure having Co and Ti;
   depositing a third layer comprising Cr;
   depositing a Co-alloy layer;
   depositing a CoCrPtB layer; and
   depositing a protective overcoat.

* * * * *